COMBINED INDICATOR AND ORDER CARD FORM

Filed Feb. 4, 1966

INVENTORS
FRANCIS J. ARDIRE
ANTHONY DePASQUALE

BY G. R. Gugger
AGENT

United States Patent Office 3,407,781

Patented Oct. 29, 1968

3,407,781
COMBINED INDICATOR AND ORDER CARD FORM

Francis J. Ardire, Binghamton, N.Y., and Anthony De Pasquale, Neuilly-sur-Seine, France, assignors to International Business Machines Corporation, Armonk, N.Y., a corporation of New York Filed Feb. 4, 1966, Ser. No. 525,172
4 Claims. (Cl. 116—114)

ABSTRACT OF THE DISCLOSURE

This combined indicator and order card form comprises a central portion having a pair of depressible tabs insertable into the hollow core of a roll of tape to frictionally and removably affix the form to said roll. Extending outwardly in opposite directions from the central portion are an elongated indicator portion and an order card portion, both of which lie flat against the convolutions of tape and serve to stabilize the form when affixed to the core. The indicator portion has graduated markings to indicate the amount of tape between each mark and the hollow core, and the detachable order card portion has data thereon to identify the particular type of tape for reorder purposes.

This invention relates to an indicator and order card and more particularly to a combination footage indicator and reorder card for use with tape rolls and the like.

The complexities of modern business has resulted in increased applications and usage of information storage tapes, such as magnetic tapes and punched hole tapes for the transfer of information and as input and control media for computing machines, and the like. As a result, it becomes increasingly desirable for the operator to be able to readily ascertain the remaining footage on a partially used roll of tape. Also, in view of the increasing rate that such tapes are being used up it is also desirable that the operator be provided with a quick and simple means for reordering tapes of a particular type or to request replacement of a defective tape.

In providing the above desirable features, the present invention makes use of a combination footage indicator and reorder card which may be simply attached to the core of a tape roll. The card is provided with a pair of folding tabs which are insertable in the center core of the tape roll. An extension of the card overlies the convolutions of the tape and carries a graduated scale which indicates the tape footage on the core. The card is further provided with a detachable stub portion on which is printed the tape guarantee and also the pertinent specifications of the tape. The stub portion is in the form of a machine processible record and it is provided with punched hole data relating to the particular type of tape being used. This stub serves as a reorder card and to reorder or replace a tape, the operator simply detaches the stub portion and sends it to the appropriate supplier.

Accordingly, a principal object of the present invention is to provide a novel footage indicator and reorder card which can be conveniently affixed to each tape roll.

A further object of the present invention is to provide a novel card for attachment to a tape roll, which card comprises a graduated scale footage indicator portion and a detachable machine processible reorder stub portion.

A still further object of the present invention is to provide novel means effective to visually indicate the amount of tape remaining on a partially used tape roll and also effective to facilitate the ordering of additional tape when the roll is used up.

The foregoing and other objects, features and advantages of the invention will be apparent from the following more particular description of a preferred embodiment of the invention, as illustrated in the accompanying drawings.

Figure 1:
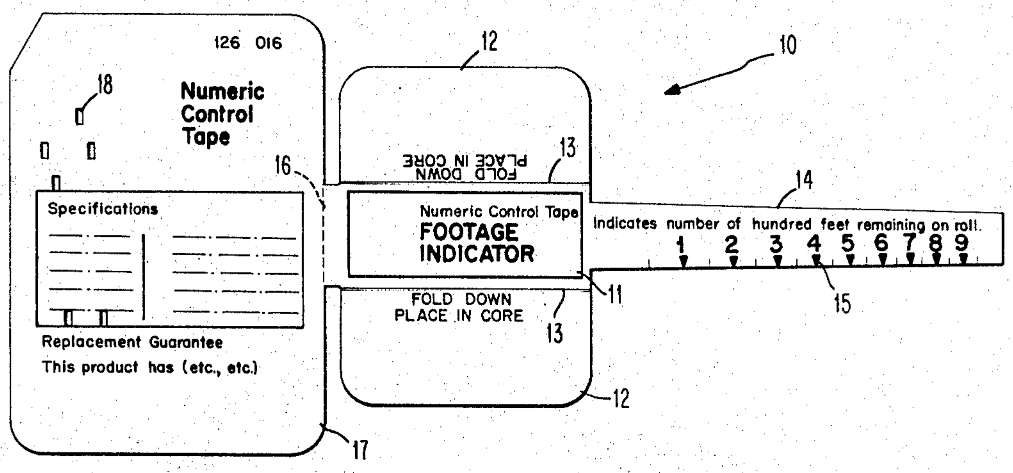
FIG. 1 is a plan view of a footage indicator and reorder card constructed in accordance with the principles of the present invention.

Referring to the drawings, the indicator and order card 10 is preferably made of light cardboard and comprises a central portion 11 having a pair of tabs 12 which are foldable along the fold lines 13. As indicated by the printing on the tabs 12, these tabs are adapted to be folded down and inserted into the core of a tape roll to position the card on the roll. There is printed on the central portion 11 an indication of the type of tape such as, for example, numeric control tape.

Integral with the central portion 11 is an elongated indicator portion 14. In the example shown, the length of the footage indicator is designed for a tape having a length of 1000 feet and the footage indicator is graduated into 50-foot increments 15. Locations of these increments, from 0 feet to 1000 feet may be determined by actually winding the tape on a rewinding machine, stopping the machine at each 50-foot increment and accurately measuring the distance from the core (0 feet) to the outer convolution.

Detachably connected to the central portion 11, by a line of weakness 16, is a machine processible stub or record card 17. Printed on the card 17 is the name and number of the tape, the tape specifications and a guarantee clause. The tape specifications may include, for example, the length, width, thickness, color, material and opacity. The card 17 also includes punched data 18 which generally corresponds to the number of the tape, and the like, and this data would be machine sensed when reordering tape.

Figure 2:
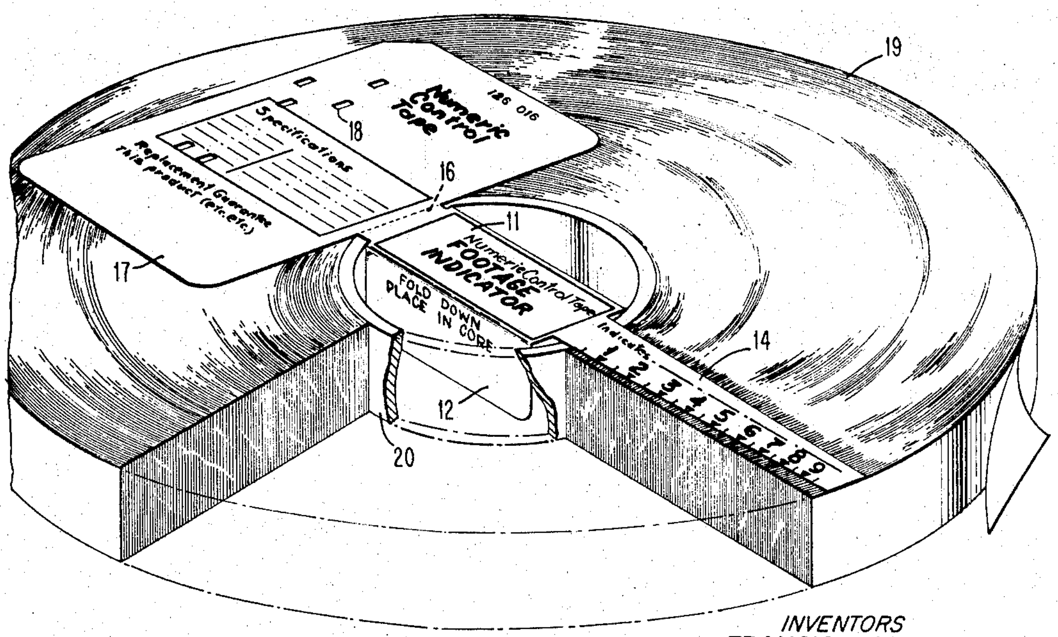
FIG. 2 is a cut-away view of a tape roll with the card of FIG. 1 attached.

In FIG. 2, an indicator and reorder card is shown attached to a roll of tape 19. To attach the card, the tab portions 12 are simply folded down perpendicular to the plane of the central portion 11 and inserted into the core 20 of the tape roll. The tabs fit snugly in the core and the indicator portion 14 and reorder card portion 17 lie flat against the convolutions of the tape. To reorder or replace a tape, the reorder card 17 is simply detached along the line of weakness 16 and sent to the supplier. The indicator portion 14 gives a clear visual indication of the amount of tape on the roll.

The present invention provides a very useful dual purpose device which aids the operator in the handling and replacement of tapes. In addition to providing a detachable reorder card coupled with an amount of tape indicator, it further aids both the tape salesmen and the tape users in that it also visually displays the complete specifications of the tape and the statement guaranteeing these specifications. And it is a simple matter to assemble one card onto each tape roll prior to shipment. Of course, the indicator portion may be graduated into other than feet and instead of punched holes, the reorder card may be provided with magnetic recording, or the like, for machine sensing.

While the invention has been particularly shown and described with reference to a preferred embodiment thereof, it will be understood by those skilled in the art that various changes in form and details may be made therein without departing from the spirit and scope of the invention.

What is claimed is:

1. A combined indicator and order card form for use with a roll of tape having a hollow core member which comprises a central portion having a pair of tabs foldable perpendicular to the plane of said central portion and adapted for insertion into the core member to frictionally and removably affix the form to said roll of tape;

a narrow elongated indicator portion extending outward from one end of said central portion and having a length corresponding to the distance between the core and the outermost convolution of said tape roll, said indicator portion adapted to extend radially outward from the tape roll core and to lie flat against the convolutions of tape;

graduated markings on said indicator portion for indicating the amount of tape between each mark and the tape roll core; and an order card portion detachably connected to the opposite end of said central portion and adapted to extend radially outward from the tape roll core and to lie flat against the convolutions of tape and serving to stabilize the form when so affixed, said card portion having printed data thereon relating to the tape on the tape roll.

2. A combined indicator and order card form as defined in claim 1 wherein said detachable order card portion is machine processible and includes indicia relating to said tape which is adapted to be machine read.

3. A combined indicator and order card form as defined in claim 1 wherein said detachable order card portion is connected to said central portion by a line of weakness.

4. A combined indicator and order card form as defined in claim 1 wherein said central portion and foldable tabs form a U-shaped portion adapted to extend substantially across the inside of said hollow core member.

References Cited

UNITED STATES PATENTS

| | | | |
|---|---|---|---|
| 1,940,088 | 12/1933 | Harrison | 206—52 |
| 2,511,708 | 6/1950 | Hammond. | |
| 2,802,290 | 8/1957 | Carey | 40—2 |
| 2,829,618 | 4/1958 | Ostergard | 116—114 |
| 2,930,479 | 3/1960 | Lowe | 206—52 |
| 3,051,583 | 8/1962 | Tindall | 206—52 XR |
| 3,069,510 | 12/1962 | Noble. | |

FOREIGN PATENTS

| | | |
|---|---|---|
| 794,874 | 5/1958 | Great Britain. |
| 1,246,572 | 10/1960 | France. |

LOUIS J. CAPOZI, *Primary Examiner.*